United States Patent [19]
Iljunin et al.

[11] 4,125,433
[45] Nov. 14, 1978

[54] FUEL ASSEMBLY FOR A NUCLEAR FAST NEUTRON REACTOR

[76] Inventors: Vladimir G. Iljunin, ulitsa Zvezdnaya, 15, kv. 70; Viktor M. Murogov, ulitsa Lenina, 13/1, kv. 4; Mikhail F. Troyanov, ulitsa Lenina, 36a, kv. 30; Anatoly A. Rineisky, ulitsa Lyashenko, 2, kv. 35, all of Obninsk Kaluzhskoi oblasti; Anatoly N. Shmelev, Proletarsky prospekt, 77, kv. 96, Moscow, all of U.S.S.R.

[21] Appl. No.: 751,526

[22] Filed: Dec. 16, 1976

[51] Int. Cl.² .............................................. G21C 3/02
[52] U.S. Cl. ....................................... 176/68; 176/40
[58] Field of Search ...................... 176/40, 50, 59, 61, 176/60, 65, 68

[56] References Cited
U.S. PATENT DOCUMENTS

| | | | |
|---|---|---|---|
| 3,208,913 | 9/1965 | Hennig | 176/61 X |
| 3,226,300 | 12/1965 | Zmola et al. | 176/61 X |
| 3,255,083 | 7/1966 | Klahr | 176/40 X |
| 3,441,477 | 4/1969 | Stamford et al. | 176/59 |
| 3,549,493 | 12/1970 | Germer | 176/50 X |
| 3,660,231 | 5/1972 | Fox et al. | 176/59 X |
| 3,799,839 | 3/1974 | Fischer et al. | 176/68 |
| 3,816,247 | 11/1974 | Cayol et al. | 176/40 X |

Primary Examiner—Peter A. Nelson
Attorney, Agent, or Firm—Lackenbach, Lilling & Siegel

[57] ABSTRACT

A fuel assembly for a nuclear fast neutron reactor comprises a shroud having an upstream head piece and a downstream tail piece. The shroud houses fuel elements having portions filled with fissionable and raw materials and plenums serving as accumulation reservoirs for fission gases evolved in the fuel. The fission-gas plenums are divided into a central and peripheral groups. At least one of these groups is positioned in the tail piece of the fuel assembly shroud downstream of the coolant inlet ports before the portions filled with fissionable and raw materials.

7 Claims, 4 Drawing Figures

FUEL ASSEMBLY FOR A NUCLEAR FAST NEUTRON REACTOR

This invention relates to nuclear fast reactors and can be employed for improvement of the construction of fuel assemblies which comprise the active zone of a nuclear fast reactor.

The known fuel assembly of a fast reactor (e.g. BN-350 /USSR/, Phenix/France/, PFR/Gr. Britain/) comprises a shroud having a head piece from one butt and a tail piece from the other butt and housing fuel pins provided with portions filled with fissionable and raw materials and gas plenums as are reservoirs for fission gases. All fission gas plenums are positioned within the fuel assembly shroud and downstream of the coolant either before or after the fuel pins portions which are filled with fissionable and raw materials. In such a design of the fuel assembly the shroud withstands the difference of the coolant pressure within the fuel assembly and the pressure of the coolant in the intermediate space of the active zone. In this fuel assembly the pressure in the inter-assembly space is equal to the coolant pressure at the outlet of the fuel assembly, that is it is directly proportional to the hydraulic resistance of the fuel assembly. Mechanical stresses produced in the shroud material predetermine greater thickness of the shroud. This means that the volumetric portion of construction materials in the active zone is still large, which inadvertently affects the neutron balance in the active zone and, finally, deteriorates conversion characteristics of a fast reactor. It is an important problem to reduce the volumetric portion of the shroud walls in the active zone of the fuel assemblies and, consequently, to improve conversion of nuclear fuel in fast reactors.

This problem is partially solved by reducing the hydraulic resistance of the fuel assembly and, consequently, the coolant pressure drop therein. For this purpose the fission-gas plenums of the fuel pins are divided into two groups: a central group comprising gas plenums in the immediate vicinity of the longitudinal fuel assembly axis and a peripheral group. The gas plenums of the different groups are located at the opposite pieces (head and tail) of the fuel assembly axis. Thus, the fission-gas plenums of the central group are positioned upstream of the coolant inlet ports, whereas the fission-gas plenums of the peripheral group are positioned downstream of the coolant inlet ports.

With such a design, the coolant pressure drop of the fuel assembly remains large, as well as the shroud wall thickness. Besides, such design provides for considerable increase of the overall length of the fuel assembly (by the length of the gas plenum). In addition, a longer fuel assembly means more complicated production and larger dimensions of the reactor and the fuel assembly manipulation is also more complicated.

It is an object of this invention to provide a fuel assembly for a fast reactor which ensures reduction of the coolant pressure drop.

Another object of this invention is to provide a fuel assembly of a fast reactor which also ensures reduction of the volumetric portion of the fuel assembly shroud walls in the active zone of the fast reactor.

The invention is achieved by a fuel assembly for a fast reactor, which comprises a head piece at one butt and a tail piece at the other butt and a shroud housing fuel elements having portions filled with fissionable and raw materials and gas plenums serving as reservoirs for fission gases, which are divided into a central group and a peripheral group. At least one of said groups is located in the tail piece of the fuel assembly shroud downstream of the coolant inlet ports before the portions of the fuel elements filled with fissionable and raw materials. Such group comprises the fission-gas plenums, which are arranged downstream of the coolant inlet ports before the fuel elements portions filled with fissionable and raw materials.

It is desirable that in a fuel assembly of a fast reactor, in order to increase the number of gas plenums located in the tail piece of the shroud, said gas plenums be arranged closer to one another than the respective portions of the fuel elements filled with fissionable and raw materials.

It is also advisable that in a fuel assembly of a fast reactor, the number of fission-gas plenums located in the tail-piece of the shroud be equal to 25–100% of the total number of fuel elements.

Such design of a fuel assembly of a fast reactor permits, according to the invention, reduction of the pressure for which the shroud wall is rated at the maximum coolant speed, and this ensures reduction of the volumetric portion of the fuel assembly shroud wall. Such reduction of the volumetric portion of construction materials in the active zone of a fast reactor permits increase of the breeding gain and the fuel doubling time.

The invention will now be described in greater detail with reference to specific embodiments thereof taken in conjunction with the accompanying drawings, wherein.

Figure 1:
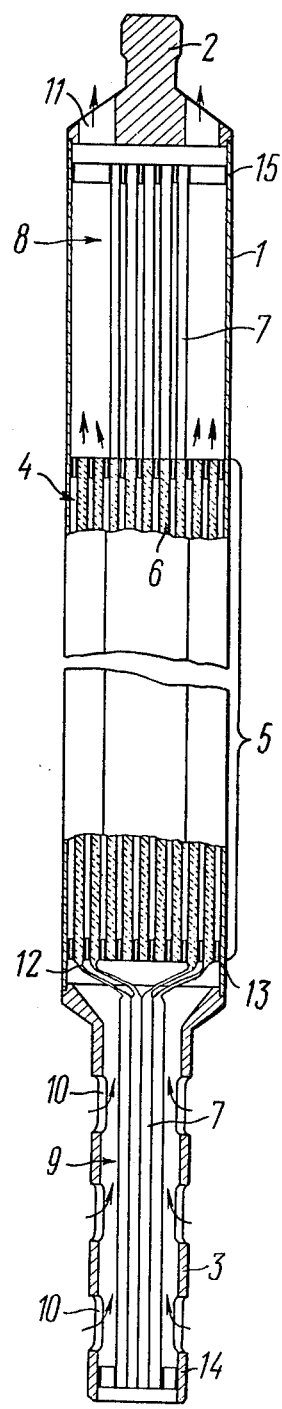
FIG. 1 shows a vertical elevational view of a fuel assembly of a nuclear fast reactor, with portions thereof shown in sections.

The fuel assembly of a fast reactor comprises, according to the invention, a shroud 1 (FIGS. 1, 2, 3, 4) having a head piece 2 from one butt and a tail piece 3 from the other butt. The shroud 1 houses fuel elements 4 having portions 5 filled with fissionable and raw materials 6 and gas plenums 7 for collection of fission gases.

The fission gas plenums 7 are divided into a central group 8 located in the immediate vicinity of the longitudinal fuel assembly axis and a peripheral group 9. At least one group is placed downstream of the coolant inlet ports 10 made in the tail piece 3 before the portions 5 of the fuel elements 4 filled with fissionable and raw materials 6. The coolant leaves the shroud 1 through outlet ports 11 made in the head piece 2.

The fission gas plenums 7, located downstream of the coolant inlet ports 10 before the portions 5 of the fuel elements 4 filled with fissionable and raw materials 6, are positioned in the tail piece 3 of the shroud 1. Such design of the fuel assembly, according to the invention, permits reduction of the overall length of the fuel assembly and a coolant pressure drop by 20–30%. As a result, the volumetric portion of the constructional materials in the active zone of the fast reactor is considerably reduced.

The number of fission gas plenums located in the tail piece 3 of the shroud 1 is equal to 25–100% of the total number of the fuel elements 4. When the internal cross-section of the tail piece amounts to 0.4 of the internal cross-section of the fuel assembly, it is advisable that the number of gas plenums inside the tail piece be 25% of the total number of fuel elements. The fact that the gas plenums located in the tail piece are closer to one another, as compared to corresponding portions of the fuel elements filled with fissionable and row materials, permits an increase of the number of gas plenums located in the tail piece up to 50–60% of the total number of the fuel elements. With a additional increase of the internal cross-section of the tail piece to approximately 0.7 of the internal cross section of the fuel assembly, the tail piece can house 100% of gas plenums.

Various embodiments of the novel fuel assemblies of the invention for fast reactors are illustrated in FIGS. 1, 2, 3, 4 and all have, according to the invention, the tail piece of the shroud housing either the peripheral group of the gas plenums or the central group or both at the same time.

Referring to FIG. 1, a fuel assembly has a, tail piece 3 of the shroud 1 housing a peripheral group 9 of the gas plenums 7, which is located downstream of the coolant inlet ports 10 before the portions 5 of the fuel elements 4, which are filled with the fissionable and raw materials 6. In this embodiment, the central group 8 of the gas plenums 7 is located in the shroud 1 of the fuel assembly after the portions 5 of the fuel elements 4 downstream of the coolant inlet ports 10.

The gas plenums 7 housed in the tail piece 3 of the shroud 1 are positioned closer to one another and form a tight bundle, than the respective portions 5 of the fuel elements 4 filled with fissionable and raw materials 6. The bends of the gas plenums 7 intended to form the tight bundle are made at portions 12 of the gas plenums 7, which diameters are less than the diameters of respective portions 5 of the fuel elements 4. These portions 12 permit simplification of the tight bundle formation and improve the coolant distribution near the portions 5 of the fuel elements 4 filled with fissionable and raw materials 6. Formation of the tight bundle of the gas plenums 7 located in the tail piece 3 of the shroud 1 permits an increase of the gas plenums 7 located in the tail piece 3.

The portions 5 of the fuel elements 4, filled with fissionable and raw materials 6, are secured in the shroud 1 by means of spacing and supporting grids 13. The gas plenums 7 housed in the tail piece 3 of the shroud 1 are secured by means of a support grid 14, whereas the gas plenums 7 located after the portions 5 of the fuel elements 4 downstream of the coolant inlet ports are secured by means of a support grid 15.

In another embodiment of a fuel assembly, the tail piece 3 of the shroud 1 houses the central group 8 (FIG. 2) of the fission gas plenums 7, which is located downstream of the coolant inlet ports 10 before the portions 5 of the fuel elements 4 filled with the fissionable and raw materials 6. The peripheral group 9 of the fission gas plenums 7 is located downstream of the coolant inlet ports 10 after the portions 5 of the fuel elements 4 in the shroud 1.

The number of the gas plenums 7 located in the tail piece 3 of the shroud 1 is equal to 25% of the total number of the fuel elements 4.

Figure 2:
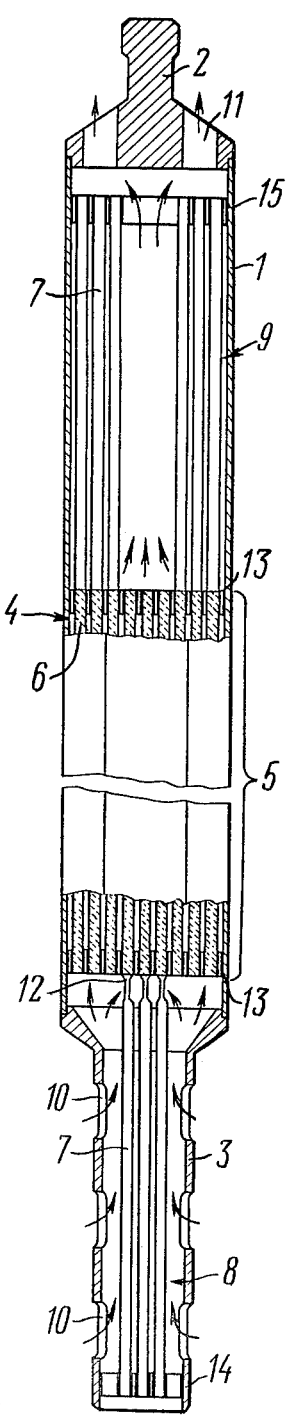
FIG. 2 shows a vertical elevational view of another embodiment of a fuel assembly of a nuclear fast reactor, with portions thereof also shown in section.
Figure 4:
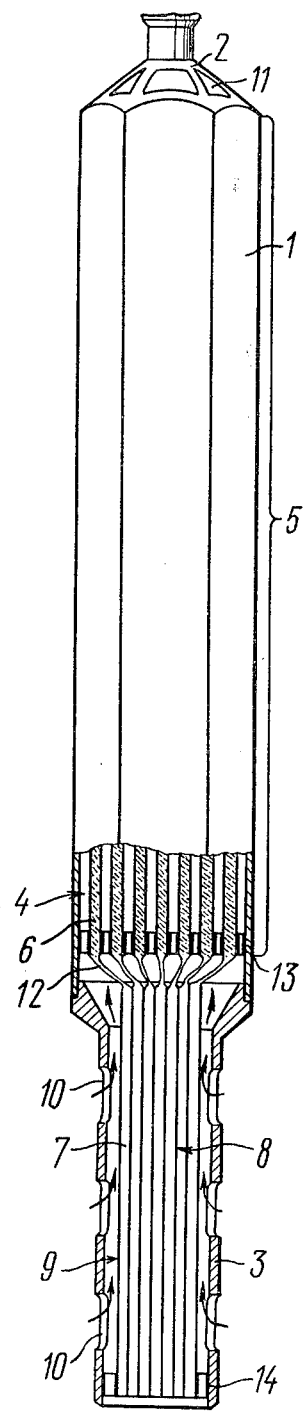
FIG. 4 shows a vertical elevational view of one of the embodiments of a fuel assembly of a nuclear fast reactor, according to the invention.
Figure 3:
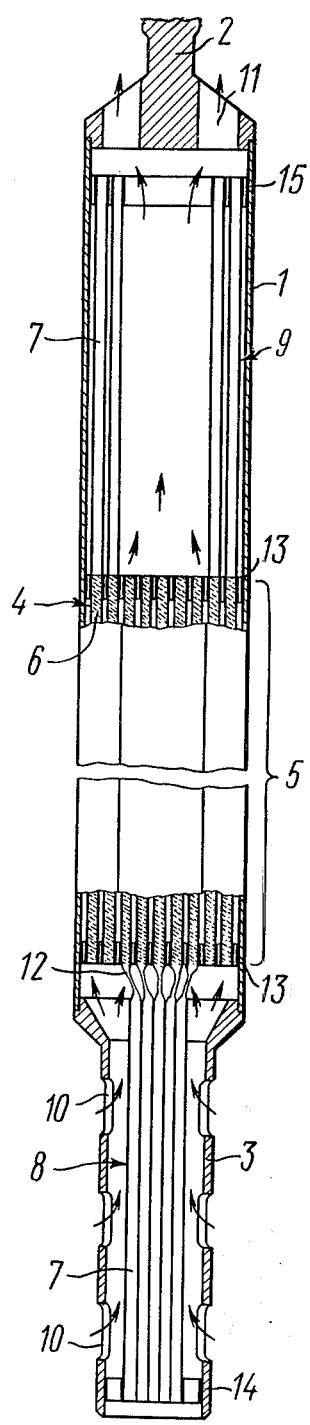
FIG. 3 shows a similar vertical elevational view of still another embodiment of a fuel assembly of a nuclear fast reactor, according to the invention.

The embodiment of a fuel assembly of FIG. 3 is similar to that of FIG. 2. The difference consists only in the number of the fission gas plenums 7 located in the tail piece 3 of the shroud 1. This number amounts approximately to 50% of the total number of the fuel elements 4. Said gas plenums 7 are brought together in a tight bundle.

The most effective assembly of the invention is another embodiment of a fuel assembly, wherein, according to the invention, the tail piece 3 (FIG. 4) of the shroud 1 houses both the central group 8 and the peripheral group 9 of the fission gas plenums 7, which are located downstream of the coolant inlet ports 10 before the portions 5 of the fuel elements 4 filled with fissionable and raw materials 6. The total number of said gas plenums 7 amounts to 100% of the total number of the fuel elements 4. These gas plenums are brought together in a tight bundle.

In case the tail piece of the shroud houses the peripheral group of the gas plenums, the number of these gas plenums also constitutes 25–100% of the total number of the fuel elements.

The principle of operation of the claimed fuel assembly of a fast reactor is as follows.

The coolant is supplied through the inlet ports 10 (FIGS. 1, 2, 3, 4) into the tail piece 3 of the shroud 1 of the fuel assembly and is directed along the gas plenum 7 to the portions 5 of the fuel elements 4, which are filled with the fissionable and raw materials 6 and produce the bulk of the heat generated by the fast reactor. Further on, the coolant washes the portions 5 of the fuel elements 4 and takes in the heat produced by the nuclear reactor. The heated coolant is supplied, after the portions 5 of the fuel elements 4, filled with the fissionable and raw materials 6, to the fuel assembly outlet through the outlet ports 11 of the head piece 2 of the fuel assembly shroud 1.

The pressure of the coolant decreases while it passes inside the fuel assembly due to the available hydraulic resistance and there appears a difference in pressure inside the fuel assembly and in the interassembly space. The fact that the gas plenums 7 are located in the tail piece 3 of the fuel assembly permits reduction of the pressure drop on the shroud 1.

This design of the fuel assembly of a fast reactor permits, according to the invention, reduction of the pressure for which the shroud wall is rated at a maximum coolant speed and this ensures decreasing the volume portion of the shroud walls to approximately 50%. As the table below indicates, such reduction of the volumetric portion of the construction materials in the active zone of the nuclear fast reactor permits increase of the breeding gain by 0.05–0.07 in fast sodium reactors and reduction of the full doubling time by 20%.

Table

| Characteristics | Embodiment | |
|---|---|---|
| | Reactor of the type BN-350 /USSR/ | Reactor equipped with fuel assembly, according to the invention |
| Volume portion of assembly wall | 0.10 | 0.05 |
| Total conversion ratio | 1.27 | 1.32 |
| Internal conversion ratio | 0.72 | 0.80 |
| Mean reactor thermal stress, kw/l | 560 | 560 |
| Specific fuel charge, $\frac{fuel,kg}{Mwe}$ | 2.7 | 2.7 |
| Doubling time, years | 12.8 | 10.2 |

What is claimed is:

1. A fuel assembly for a nuclear fast reactor, which comprises:

a shroud having first and second butts;

a tail piece connected to said shroud at the first butt and having inlet ports for a coolant;

a head piece connected to said shroud at the second butt and having outlet ports for said coolant;

fuel elements located in said shroud and having portions filled with fissionable and raw materials and respective gas plenums which serve as accumulation reservoirs for evolved fission gases; and said gas plenums being divided into a central group and a peripheral group, with at least one of said groups being located in said tail piece downstream of said coolant inlet ports before said portions of said fuel elements filled with said fissionable and raw materials; whereby the breeding gain of said reactor is increased and the fuel doubling time is reduced.

2. A fuel assembly for a fast reactor as claimed in claim 1, wherein the number of said gas plenums serving as accumulation reservoirs for said evolved fission gases which are located in said tail piece is equal to 25–100% of the total number of said fuel elements.

3. A fuel assembly for a fast reactor as claimed in claim 1, wherein the other of said groups of said gas plenums is located in said head piece.

4. A fuel assembly for a fast reactor as claimed in claim 1, wherein both of said groups of said gas plenums are located in said tail piece.

5. A fuel assembly for a fast reactor as claimed in claim 3, wherein said group of said gas plenums located in said tail piece constitute said central group and form a tight bundle since said gas plenums are positioned close to one another as compared to corresponding portions of said fuel elements.

6. A fuel assembly for a fast reactor as claimed in claim 4, wherein both of said groups of said gas plenums in said tail piece form a tight bundle as said gas plenums are positioned close to one another.

7. A fuel assembly for a fast reactor as claimed in claim 3, wherein said group of said gas plenums located in said tail piece forms said peripheral group of gas plenums and said other group of gas plenums forms a tight bundle in said head piece.

* * * * *